(12) United States Patent
Ali

(10) Patent No.: US 8,881,121 B2
(45) Date of Patent: Nov. 4, 2014

(54) PROCESSING AN OBJECT-ORIENTED QUERY TO RETRIEVE DATA FROM A DATA SOURCE

(75) Inventor: Amr Ali, Giza (EG)

(73) Assignee: International Business Machines Corporation, Armonk, NY (US)

( * ) Notice: Subject to any disclaimer, the term of this patent is extended or adjusted under 35 U.S.C. 154(b) by 1300 days.

(21) Appl. No.: 12/372,940

(22) Filed: Feb. 18, 2009

(65) Prior Publication Data

US 2010/0211939 A1    Aug. 19, 2010

(51) Int. Cl.
*G06F 9/44* (2006.01)
*G06F 9/45* (2006.01)
*G06F 17/30* (2006.01)

(52) U.S. Cl.
CPC ............ *G06F 17/30607* (2013.01); *G06F 8/42* (2013.01)
USPC ........... 717/143; 717/112; 717/116; 717/140; 717/141; 707/759

(58) Field of Classification Search
None
See application file for complete search history.

(56) References Cited

U.S. PATENT DOCUMENTS

| | | | |
|---|---|---|---|
| 4,916,610 A * | 4/1990 | Bapat | 717/141 |
| 5,761,493 A | 6/1998 | Blakeley et al. | |
| 5,778,379 A | 7/1998 | Blackman et al. | |
| 5,822,589 A * | 10/1998 | Diamant et al. | 717/131 |
| 5,826,077 A | 10/1998 | Blakeley et al. | |
| 6,367,068 B1 * | 4/2002 | Vaidyanathan et al. | 717/143 |
| 6,378,126 B2 * | 4/2002 | Tang | 717/143 |
| 6,574,639 B2 | 6/2003 | Carey et al. | |
| 6,757,889 B1 * | 6/2004 | Ito | 717/112 |
| 7,136,848 B2 | 11/2006 | Carlson et al. | |
| 7,480,650 B2 * | 1/2009 | Miller | 707/999.003 |
| 7,607,121 B2 * | 10/2009 | Chow et al. | 717/116 |
| 7,996,416 B2 * | 8/2011 | Ebersole | 707/759 |
| 8,010,952 B2 * | 8/2011 | Datla et al. | 717/143 |
| 2004/0193575 A1 | 9/2004 | Chen et al. | |
| 2006/0004774 A1 | 1/2006 | Alcorn | |
| 2007/0028223 A1 * | 2/2007 | Meijer et al. | 717/140 |

(Continued)

FOREIGN PATENT DOCUMENTS

WO    WO 2007018826 A2    2/2007

OTHER PUBLICATIONS

Willis, D., et al., Efficient Object Querying for Java, Springer-Verlag Berlin Heidelberg, ECOOP 2006, pp. 28-49, [retrieved on May 3, 2012], Retrieved from the Internet: <URL: http://www.springerlink.com/content/a55067374j850106/>.*

(Continued)

*Primary Examiner* — Thuy Dao
*Assistant Examiner* — Geoffrey St Leger
(74) *Attorney, Agent, or Firm* — Kenneth L. Sherman, Esq.; Michael Zarrabian, Esq.; Sherman & Zarrabian LLP

(57) ABSTRACT

An object-oriented query to retrieve data from a data source stored on a data storage device connected to a computer is processed. One implementation involves receiving a Java Query Language (JQL) user query, compiling the JQL query using a Java compliant compiler, and detecting any compilation error due to a syntax error in the JQL query. If a compilation error is detected, then informing the user of the compilation error such that the user may correct the syntax error in the JQL query. Otherwise if a compilation error is not detected, then processing the JQL query for execution.

15 Claims, 5 Drawing Sheets

```
OrderDetailTable o = NorthwndDatabase.getInstance().getOrderDetailTable();
int average =
JQL
(
        SELECT(AVG(DISTINCT(o.UnitPrice)))
);
```

Type mismatch: cannot convert from Double to int
Press 'F2' for focus.

(56) References Cited

U.S. PATENT DOCUMENTS

2007/0244865 A1* 10/2007 Gordon et al. .................. 707/3
2008/0021888 A1*  1/2008 Miller ............................. 707/3
2009/0259683 A1* 10/2009 Murty ...................... 707/103 R

OTHER PUBLICATIONS

Pearce, D., et al., JQL v0.3.1 README File, Jun. 21, 2007, 4 pages, [retrieved on Dec. 5, 2012], Retrieved from the Internet: <URL:http://web.archive.org/web/20070621010809/http://www.mcs.vuw.ac.nz/~darren/jql/download.html>.*

Willis, D., et al., Caching and Incrementalisation in the Java Query Language, Proceedings of the 23rd ACM SIGPLAN conference on Object-oriented programming systems languages and applications, 2008, pp. 1-18, [retrieved on May 2, 2012], Retrieved from the Internet: <URL:http://dl.acm.org/>.*

Robinson, A., Integrating a Universal Query Mechanism into Java, Thesis, Rochester Institute of Technology, Sep. 8, 2007, 51 pages, [retrieved on May 2, 2012], Retrieved from the Internet: <URL:https://ritdml.rit.edu/handle/1850/4816>.*

Codd, E.F., "A Relational Model of Data for Large Shared Data Banks," Communications of the ACM, vol. 13, No. 6, Jun. 1970, pp. 377-387.

Andersen, L., "JDBC 4.0 Specification," JSR 221, Sun Microsystems, Nov. 7, 2006, pp. 1-126.

Willis, D., "The Java Query Language", a Thesis submitted to the Victoria University of Wellington, (2008), pp. 1-116, located at http://209.85.173.132/search?q=cache:ZguZ6g_8QZ4J:homepages.ecs.vuw.ac.nz/~djp/files/MSCThesisDWillis.pdf+JQL+The+Java+Query+Language&hl=en&ct=clnk&cd=4&gl=us.

Demichiel et al., "JSR 220: Enterprise JavaBeans, Version 3.0," EJB 3.0 Simplified API, Sun Microsystems, May 2, 2006, pp. 1-59.

Russell, C. et al., "Java Data Objects," JSR 12, Version 1.0.1, Java Data Objects Expert Group, Sun Microsystems, May 31, 2003, pp. 1-200.

Mak, G., "Hibernate Tutorial 9, Hibernate Query Language", Sep. 2006, located at http://metaarchit.com/hibernate_tutorials/Hibernatec%20Tutorial%2009.pdf, pp. 1-8.

Box et al., "The LINQ Project," .NET Language Integrated Query, May 2006, Microsoft Corporation, pp. 1-29.

Negovan, Milan, "LINQ Standard Query Operators", last updated Dec. 17, 2007, at www.AspNetResources, downloaded at http://www.coderjournal.com/uploads/2008/02/linq-standard-query-operators.pdf, pp. 1-2.

Ahadian, A., "Understanding pureQuery, Part 1: pureQuery: IBM's new paradigm for writing Java database applications," Eclipse Application Development Tools, IBM, developerWorks, Aug. 16, 2007, pp. 1-38.

Sunderramen, R., "SQLJ: Embedded SQL in Java" Oracle 9i ProQramminQ, Jun. 2, 2003, Chapter 6 pp. 273-308, Georgia State University, located at http://tinman.cs.gsu.edu/-raj/books/Oracle9-chapter-6.pdf.

* cited by examiner

```
JQL
(
    SELECT  (e),
    WHERE
    (
        e. EmployeeID.equal ("2")
    )
);
```

Bound mismatch: The generic method equal(N) of type NumericColumn<C,T> is not applicable for the arguments (String). The inferred type String is not a valid substitute for the bounded parameter <N extends Number>

Press 'F2' for focus.

FIG. 3

```
OrderDetailTable o = NorthwndDatabase. getInstance () . getOrderDetailTable() ;
int average =
    JQL
    ~~~~
         SELECT(AVG(DISTINCT (o.UnitPrice)))
         ~~~~~~~~~~~~~~~~~~~~~~~~~~~~~~~~~~
       );
       ~~
    ┌─────────────────────────────────────────────────┐
    │ Type mismatch: cannot convert from Double to int│
    │           Press 'F2' for focus.                 │
    └─────────────────────────────────────────────────┘
```

FIG. 4

PROCESSING AN OBJECT-ORIENTED QUERY TO RETRIEVE DATA FROM A DATA SOURCE

BACKGROUND

The invention relates generally to computer data models, and in particular, to object-oriented models.

Structured Query Language (SQL) is a database computer language for data retrieval such as in a relational database. SQL allows dealing with data in a declarative manner and has gained popularity with database vendors. However, when handling data programmatically, i.e., from a high level programming language (such as C, C++ or Java), a mismatch appears since a software developer has to deal with two different environments speaking two different languages. This is because the relational environment uses declarative approaches (SQL), while the object-oriented environment uses procedural and object-based approaches. As such, the developer has to learn database languages such as SQL and what comes with it, such as stored procedures and data types, while also mastering programming languages such as Java, C, C++, C Sharp (C#) programming language, or even Visual Basic. Furthermore, the developer has to master the application programming interfaces (APIs) that bind said two environments together.

Object Relational Mapping (ORM) systems allow the developer to deal with objects in a simplified manner rather than dealing with raw data. ORM solutions offer the developer the ability to query relational data sources in an object-oriented manner, by providing their own query languages, such as EJB QL, JDOQL, HQL, and others.

However, using ORM, the developer still has to maintain two different languages (Java and the ORM-specific-QL provided by the ORM solutions) having different syntax, concepts and constructs. Moreover, such languages lack basic features developers have grown accustomed to such as debugging, testing, logging, etc. Further, such languages query only databases, and cannot support query of other data sources such as collections, or XML files.

SQLJ technology (a Java optimized query language) provides a programming interface that allows SQL statements to be expressed at a high level in a Java program. However, SQLJ is a new different language with different syntax written in external files. The same concept of SQLJ has also been applied to memory collections and arrays, in an attempt to provide a generalized Java based query language (Java Query Language (JQL)). However, this is for arrays and collections only, requiring composing different syntax in external files that need a pre-processing step as a front-end compiler.

Other modern programming languages such as C# and Visual Basic attempt to provide native query capabilities, and Microsoft has introduced LINQ (Language Integrated Query) providing query APIs to query different data sources. To achieve this, language syntax upgrades are made, such that "select", "from", "where", "order by", etc., become reserved key words in C#. IBM provides JLINQ which targets the same goals that LINQ targets. JLINQ offers the developer the ability to issue pure SQL statements from Java code, and get SQL validated at compile time by a special eclipse plug-in that detects the syntax mistakes and notifies the developer about them. However, using such approaches, the developer still has to maintain both Java code, and SQL code, to query a data source.

BRIEF SUMMARY

Processing an object-oriented query to retrieve data from a data source stored on a data storage device connected to a computer, is provided. One embodiment involves receiving a Java Query Language (JQL) user query, compiling the JQL query using a Java compliant compiler, and detecting any compilation error due to a syntax error in the JQL query. If a compilation error is detected, then informing the user of the compilation error such that the user may correct the syntax error in the JQL query. Otherwise if a compilation error is not detected, then processing the JQL query for execution.

Compiling the JQL query using a Java compliant compiler may further include using a Java compliant compiler for compile-time checking when parsing generics-based code in the JQL query. The user query may include a Java Query Language query comprising a type safe, Java based, object-oriented and declarative query. Said data source comprises a relational data source. Compiling the JQL query using a Java compliant compiler and detecting any compilation error due to a syntax error in the JQL query, is performed at query development time. Processing the query for execution may further include generating SQL code from the JQL query. Processing the query for execution may further include executing the query against the data source and providing query results to the user.

BRIEF DESCRIPTION THE SEVERAL VIEWS OF THE DRAWINGS

FIGS. 3 and 4 depict example compiler error messages;

DETAILED DESCRIPTION

Figure 1:
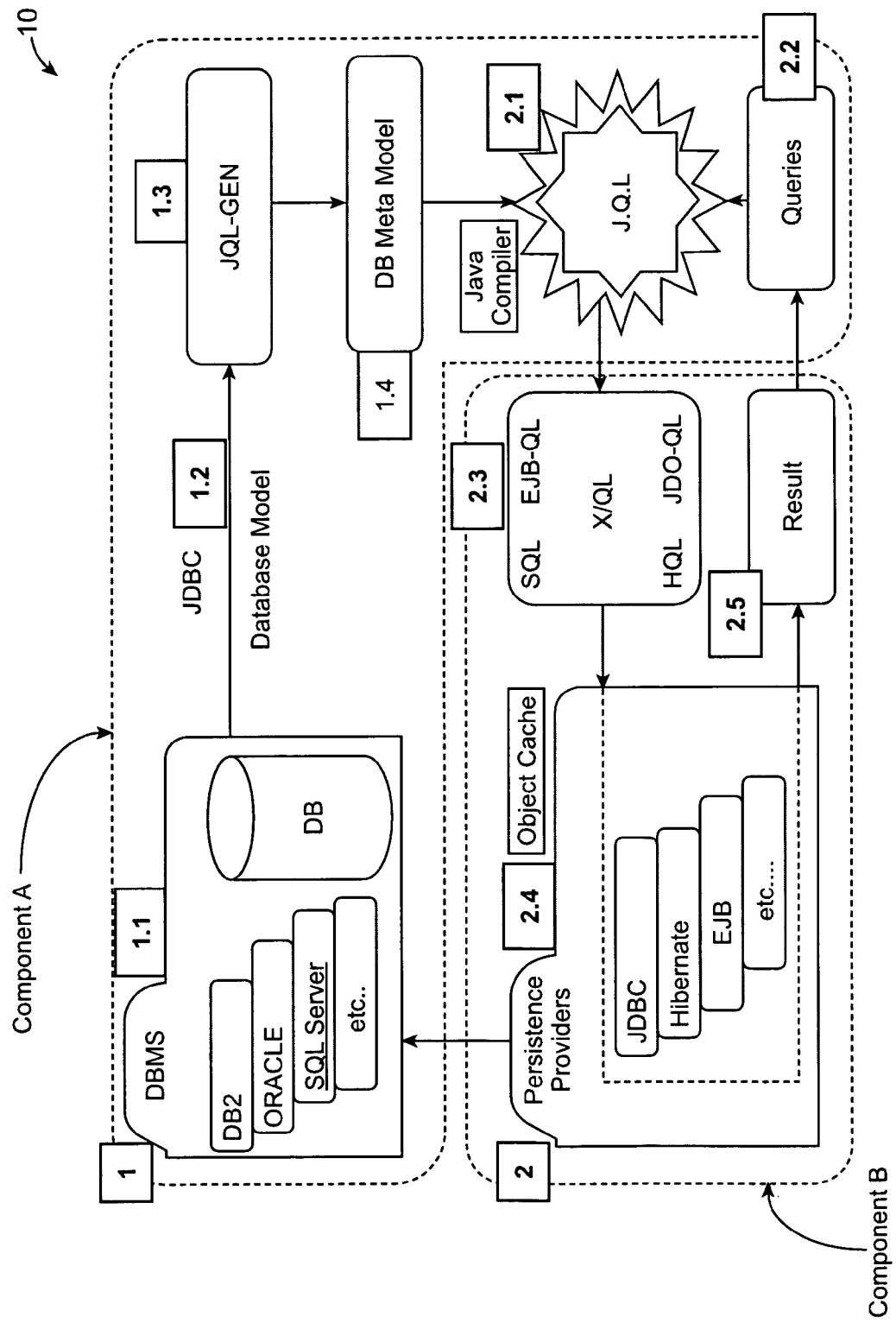
FIG. 1 shows architecture of an embodiment of a system for processing an object-oriented query to retrieve data from a data source stored on a data storage device connected to a computer.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for information technology (IT) Object-Oriented and Declarative Query Languages. While the following description will be described in terms of such languages for clarity and placing the invention in context, it should be kept in mind that the teachings herein may have broad application to all types of systems, devices and applications.

A type safe, Java based, object-oriented and declarative query programming system for querying relational data sources such as arrays, collections or XML files, is provided. The Java Query Language (JQL) is a Java-based-SQL-like, declarative, flexible, typed, and object-oriented query system for the Java programming language that can query relational data sources in a unified manner, regardless the data source provider, the language used and the location where the data exists (e.g., in memory, files, or databases).

Table 1 below shows a simple code example of a JQL query that operates on an array of integers, wherein the query selects the minimum odd number between 20 and 70 that is divisible by 5 from 40, 22, 51, 25, 44, 77 and 100.

TABLE 1

JQL query example

```
int [ ] numbers = new int [ ] {40, 22, 51, 25, 44, 77, 100};
NumberModel n = Jql.getNumberModel( );// built in model
int result =
JQL
(
        SELECT(MIN(n)),
        FROM(numbers),
        WHERE
        (
            n.between(20, 70),
            AND, n.mod(2).notEquals(0)    // odd number
            AND, n.mod(5).equals(0)       // divisible by 5
        )
);
Result→ 25
```

Using JQL can be beneficial as it is based on Java (Java was developed by Sun Microsystems). As such, JQL saves a developer the overhead of learning a new query language, such as SQL or an Object Relational Mapping (ORM) specific language such as Enterprise JavaBeans Query Language (EJB QL). The same query works for different data sources (e.g., like databases, collections of object, arrays and XML files). If the underlying data source is a relational data source (i.e., database), then a JQL query can query different databases from different vendors (e.g., DB2, SQL-Server 2000, SQL-Server 2005 and Derby). JQL also allows use, and integration with, existing ORM solutions (JQL can function as a front-end query system to the ORM solutions and the ORM solutions provide a back-end persistence provider).

According to an embodiment of the invention, a JQL module provides compile-time query syntax checking to detect syntax errors that typically occur during composing queries. A Java compiler is used to provide such compile-time checking when parsing generics-based code that JQL uses. Generally for a Java file that contains a JQL query which is compile-errors free, when such a Java file is compiled, the SQL statements that will be generated at runtime are also compile-errors free. There is no tool to compile the SQL code at development time, since the SQL code is being generated at runtime and will not be available at design time.

Unlike SQLJ or LINQ, the JQL module according to the invention does not require any compiler modification or specific pre processing. In one example, the user provided JQL query need only be compiled on a Java compliant compiler, such as a Java 5.0 compliant compiler since it uses features in Java 5.0 such as generics, varargs and enums. Further, the JQL module does not require SQL knowledge and does not require compiler modifications as JLINQ does. Since JQL is Java based, the JQL module can utilize large tooling support available for the Java language (such as debugging, testing, logging, syntax coloring, code completions, suggestions, etc.).

An implementation of a type safe, Java based, object-oriented and declarative query, programming system for querying relational data sources, according to the invention is now described. FIG. 1 shows architecture of such a programming system 10 for querying relational data sources. A general purpose computer or other processing device having a processor, memory, and storage device is suitable for implementing the system 10.

In one configuration, the system 10 queries relational data sources and is useful for querying other data sources such as collections, arrays and XML files. The system 10 utilizes JQL and includes a development (development time) component A and an execution (runtime) component B. The development component A includes a database management system 1.1, wherein a developer (user) deploys a database DB to a target database server (e.g., DB2, SQL-Server, Oracle, etc.).

Using a JQL software module (JQL-GEN) 1.3, the developer connects to the target database (DB) obtains Java Data Base Connectivity (JDBC) metadata 1.2 of the database DB. The JDBC metadata may include:

Tables.
Columns in each table.
Primary Key(s) for each table.
Referenced foreign key(s) for each table with other tables, wherein JQL-GEN module 1.3 may deduce the type of a relation as being either:
One to One relationship, One to Many relationship, or Many to Many relationship.
Views.

The JQL-GEN module 1.3 generates a database meta model 1.4 that represents the database model, and generates artifacts including:

Tables generated as Java classes.
Columns generated as Java fields.
Relations between tables converted to association between objects.
Lookup tables generated as Java enums.

The user issues a query 2.2 handled by a JQL module 2.1 to retrieve certain data from the target data source DB. The JQL module 2.1 receives a user query 2.2, wherein a Java compiler checks that it is correctly typed (i.e., there are no syntax errors).

The database meta model 1.4 is utilized later in the execution component B. The JQL module 2.1 generates the appropriate query language (X/QL) code 2.3 according to a target persistence provider system 2.4 (e.g., if the target persistence provider is Hibernate, then the JQL module 2.1 generates HQL). In this example, SQL queries are generated since most ORM solutions offer accepting queries written in SQL as well as queries written in their own query languages (it would be duplicative for the JQL to generate ORM in a specific query language, though it is possible).

In one example, the persistence provider system 2.4 handles object relational mapping of relationships, including loading and storing to the database (as specified in the metadata of the entity class), and the referential integrity of the relationships (as specified in the database). The generated query 2.3 is then propagated to an underlying persistence provider system 2.4, which may be any ORM solution (in this example the JQL module has integration with JDBC as a back-end persistence provider, and in another example other ORM solutions such as JQL can be JPA (Java Persistence API) compliant). The persistent provider system 2.4 receives the query 2.3, executes it, maps a result 2.5 and returns the result 2.5 to the JQL module 2.1.

Figure 2:
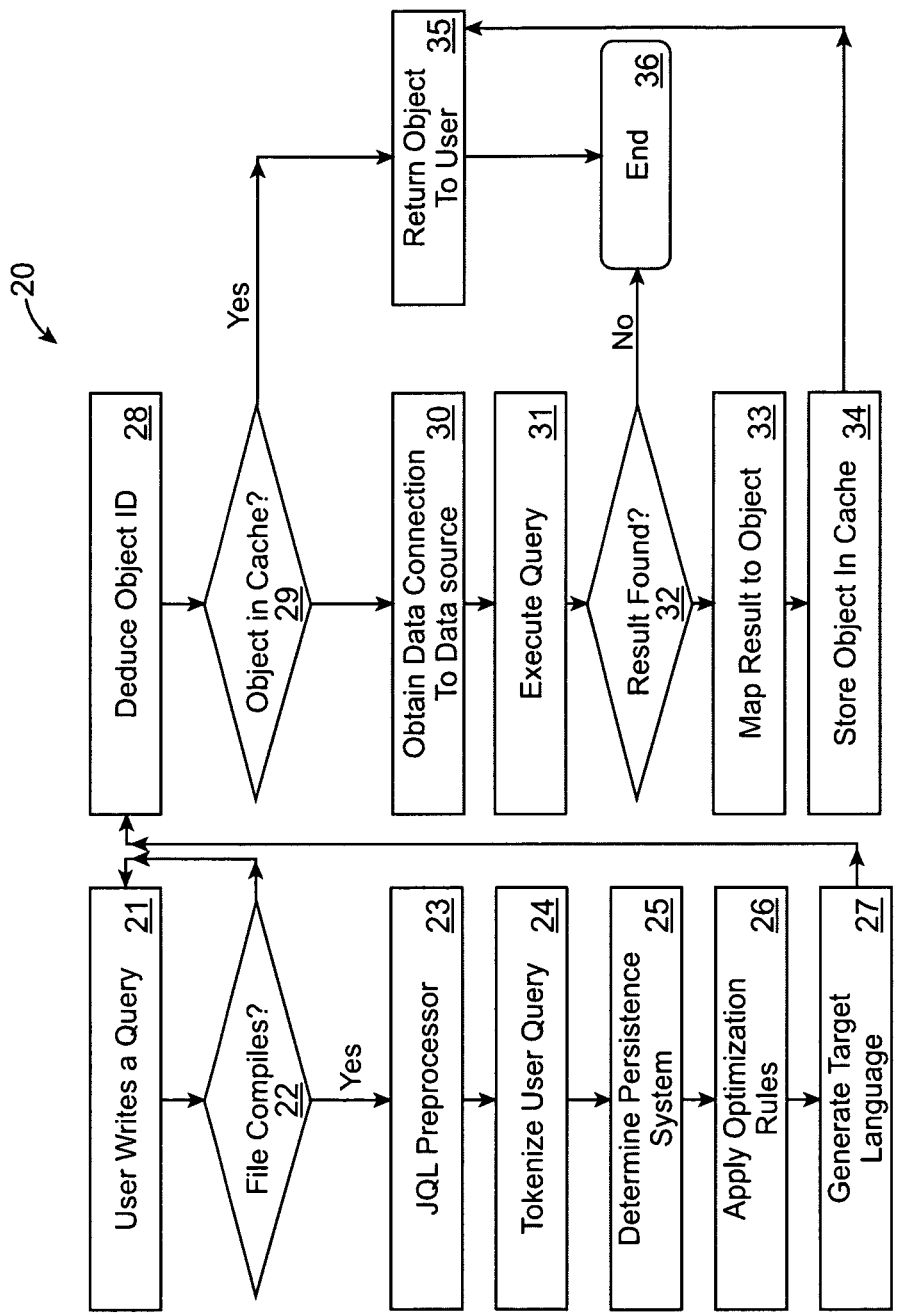
FIG. 2 shows a flowchart for an example of processing an object-oriented query to retrieve data from a data source stored on a data storage device connected to a computer.

FIG. 2 shows a flowchart of a process 20 performed by the system 10 when a user query is received. The process 20 includes the following process blocks:

Block 21: User enters a query using JQL Object-Oriented (OO) syntax in a normal Java file. A Java compiler then attempts to compile the Java file.
Block 22: If the Java file compiles successfully by the Java compiler, then the process proceeds to block 23 to process the query for execution, otherwise, the user is advised to correct the query, and the process proceeds back to block 21.

Block 23: The JQL module 2.1 pre-processes the user query and determines any suitable expansion for specific JQL constructs. For example, if the user composes a statement such as Employee.Order.OrderDetails.Product.Name, the JQL module 2.1 automatically expands this statement to the equivalent inner join when the data source is a relational data source.

Block 24: The JQL module 2.1 tokenizes the user query to the very basic atomic constructs such as SELECT, WHERE, FROM, etc.

Block 25: The JQL module 2.1 determines the target persistence/data source system, in order to determine the type of the generated query.

Block 26: The JQL module 2.1 applies simple optimization rules on the user query (e.g., may substitute inner select statements with simple WHERE clauses).

Block 27: The JQL module 2.1 generates a target query. For example, if the data source is a relational data source, and the persistence system is JDBC, then the JQL module 2.1 generates a SQL statement. If the persistence system is Hibernate, the JQL module 2.1 generates HQL, and if the data source is XML, the JQL module 2.1 generates suitable XPATH expressions, etc.

Block 28: Before invoking the data source, the JQL module 2.1 attempts to deduce the object ID from the query. For example, for the query: "SELECT employee WHERE Employee.ID=2", the JQL module 2.1 detects that the user wishes to retrieve an employee with an ID that is 2, hence the Object ID here is 2.

Block 29: Based on results of block 28, if the JQL modules 2.1 managed to deduce the Object ID correctly, the JQL module 2.1 then attempts to find this Object in an object cache at first, and if the object is found, the process proceeds to block 35, otherwise the process proceeds to block 30.

Block 30: The JQL module 2.1 establishes a connection to the target data source (persistence provider system 2.4 in FIG. 1).

Block 31: The JQL module 2.1 executes the query against the target data source.

Block 32: If the execution did not return any results from the target data source, the process proceeds to block 36, otherwise the process proceeds to block 33.

Block 33: The returned raw result from the target data source is mapped to an object (using well known mapping techniques).

Block 34: The result object is stored in a cache for future retrieval.

Block 35: The result object is also returned to the user.

In block 22, according to the invention, compilation is performed with a conventional Java compiler, without requiring special tools or external plug-ins, or a new compiler. For example, any existing Java 5 compliant compiler may be used. As such, the JQL module 2.1 relies on conventional Java compiler (FIG. 1) to provide the query language code 2.3.

Relying on the Java compiler itself is beneficial since developers have access to conventional Java compilers in their information technology environments, and Java is well understood, reducing developer learning efforts. The JQL module 2.1 is implemented using the Java Query Language which is a Java based, declarative, type safe, and object-oriented query system for the Java programming language, enabling querying of any relational data sources (e.g., arrays, collections or XML files), in a unified manner using a conventional Java compiler without any external tools. This is regardless of the data source provider, the language used or the place where the data exists (in memory, files, or databases).

The Java compiler is used to check the user query 2.2 (FIG. 1) for syntax errors from a java code point of view, as opposed to conventional approaches where the software developer composes a software tool that at runtime checks the query syntax. The JQL module 2.1 comprises a modified JQL core according to the invention that utilizes a Java compiler for checking query syntax, so that the user is informed of query errors at query compile time before actual compiling of the Java file. In one example, the JQL module 2.1 relies on features in Java 5 compiler such as generics, static imports and varargs.

The Java compiler processes Java syntax only, hence when the compiler compiles the Java code that compose the query, the compiler compiles the Java code from a Java code point of view. According to the invention, the JQL module 2.1 arranges the Java code and places it into a format as SQL-like code, where in fact it is a Java code to be compiled by the compiler, providing the benefits of writing a Java code that is well understood by the compiler for syntax checking, but in the form of SQL code.

In block 22, the Java compiler is used to compile and check the query syntax at development time, without reliance on runtime checking using specialized tools. In FIG. 1, the JQL-GEN module 1.3 generates the meta model 1.4 by employing the generics to specify the type of each column, using the JQL provided data types. For example given an integer column in an employee table in a database, the JQL-GEN module 1.3 generates a representation as:

public final NumericColumn<Employee, Integer> EmployeeID=new NumericColumn<Employee, Integer>( );

By this definition, when the user later issues a query to retrieve the EmployeeID, when for example the ID is 3, they can compose a query as:

```
JQL
(
    SELECT (e),
    WHERE
    (
            e.EmployeeID.equal(2)
    )
);
```

If the user utilizes anything but an integer in place of the supplied value 2, the Java compiler will issue an error as shown by example in FIG. 3.

Further, the JQL query construct itself (such as SELECT, FROM, WHERE, etc.), is defined in a similar manner to match the standard SQL query syntax using the same technique (generics and static imports). For example, the following is the definition of the SQL IN key word, which is used to limit the result of the supplied column to be IN specific set of values:

Protected final DataExpression<?, T>In(ColumnSelect<?, T> . . . nestedSelects)

As the definition suggests, this construct only accepts values supplied from a nest query that can only return single values. If the user supplied a nested query that returns multiple values, the Java compiler will issue an error.

The importance of static imports is that the user interaction with the system is simplified, such that without having to qualify every call to the JQL constructs with JQL word, the user can static import the call and use it directly, such that instead of writing:

```
Jql.JQL
(
    Jql.SELECT    (Jql.AVG(e.EmployeeID))
);
The user may write:
import static org.jql.utils.Jql.JQL;
import static org.jql.utils.Jql.SELECT;
import static org.jql.utils.Jql.AVG;
JQL
(
    SELECT    (AVG(e.EmployeeID))
);
```

A Java 5 feature, varargs, enables the developer to pass the same function unrestricted number of parameters, and is used in JQL in the WHERE clause, for example, to enable the user to add multiple "where" parts without restriction to a limited number.

To query any other data sources such collections (when the query is targeted to be executed against primitive types, Integers, Doubles, Boolean, etc.), the JQL module 2.1 provides built in models for such primitives types, and as such there is no need for model generation 1.4 in FIG. 1.

For querying user defined Objects (i.e., Plain Old Java Objects or POJO), the user generates a model that defines the object structure, which is automated at development time.

In the following, example program instructions are provided for querying databases, according to embodiments of the invention. The examples are based on a sample data-base (Northwind database) which is a sample database that ships with Microsoft SQL-Server product. The examples assume that the first step of generating the model 1.4 in FIG. 1 has been performed. In Example 1 of program instructions below, JQL constructs are in all capital words (e.g., SELECT( ), WHERE, ORDERBY( ), etc.).

Example 1

Select all Employees

```
EmployeeTable e = NorthwndDb.getInstance( ).getEmployeeTable( );
List<Employee> employees =
JQL
(
    SELECT(e)
);
```

Example 2

Select Employees, Who Served Orders for IBM, Order the Result by their City and Name

```
EmployeeTable e = NorthwndDb.getInstance( ).getEmployeeTable( );
List<Employee> employees =
JQL
(
    SELECT(e),
    WHERE
    (
        e.Orders.Customer.CompanyName.like("IBM")
    ),
    ORDERBY(e.City).thenBy(e.FirstName)
);
```

The above statement will generate this SQL:

```
SELECT     "NORTHWND"."EMPLOYEES*."
FROM       "NORTHWND"."ORDERS"
           INNER JOIN "NORTHWND"."EMPLOYEES" ON
           "NORTHWND"."ORDERS"."EMPLOYEEID" =
           "NORTHWND"."EMPLOYEES"."EMPLOYEEID"
           INNER JOIN "NORTHWND"."CUSTOMERS" ON
           "NORTHWND"."ORDERS"."CUSTOMERID" =
           "NORTHWND"."CUSTOMERS"."CUSTOMERID "
WHERE      "NORTHWND"."CUSTOMERS"."COMPANYNAME"
           LIKE '%IBM%'
ORDER BY   "NORTHWND"."EMPLOYEES"."CITY",
           NORTHWND"."EMPLOYEES"."FIRSTNAME"
```

The JQL module 2.1 automatically detects the relationship between orders, employees and customer tables and automatically generates the appropriate join statement. FIG. 4 shows a compile time error that ocurrs when trying to receive the result of selecting the average unit price (which is double) in an integer.

As such, preferred embodiments of the JQL system 10 according to the invention allow use of a Java compiler to check user query for syntax errors, by compiling a checking query syntax at development time, as opposed to relying on runtime checking using specialized tools.

In one case, the user query, written using JQL OO syntax in a normal Java file, is compiled at development time using the Java compiler to check for errors in query syntax. As such, the JQL system 10 utilizes standard Java code and compiler, without need for any compiler modification. There is no need for specific tooling, and the invention can be used within Eclipse, NetBeans or any other Java development tool.

The invention requires no parsers or plug-ins. Type checking at coding checking (e.g., query syntax at development time) saves time and effort over runtime type checking. This provides simplified debugging without need for pre-compilation. Query syntax is generated at runtime which means that a running application can switch from one database type (e.g., Oracle) to another type (e.g., DB2) seamlessly at runtime. As noted, development time means the time at which the user ran the JQL-GEN tool 1.3 to generate the database artifacts, and the time in which the user wrote his/her query. Runtime means the time when the program runs and executes the query that the user generated at development time.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to the processor 104 for execution. Such a medium may take many forms, including but not limited to, non-volatile media, volatile media and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Figure 5:
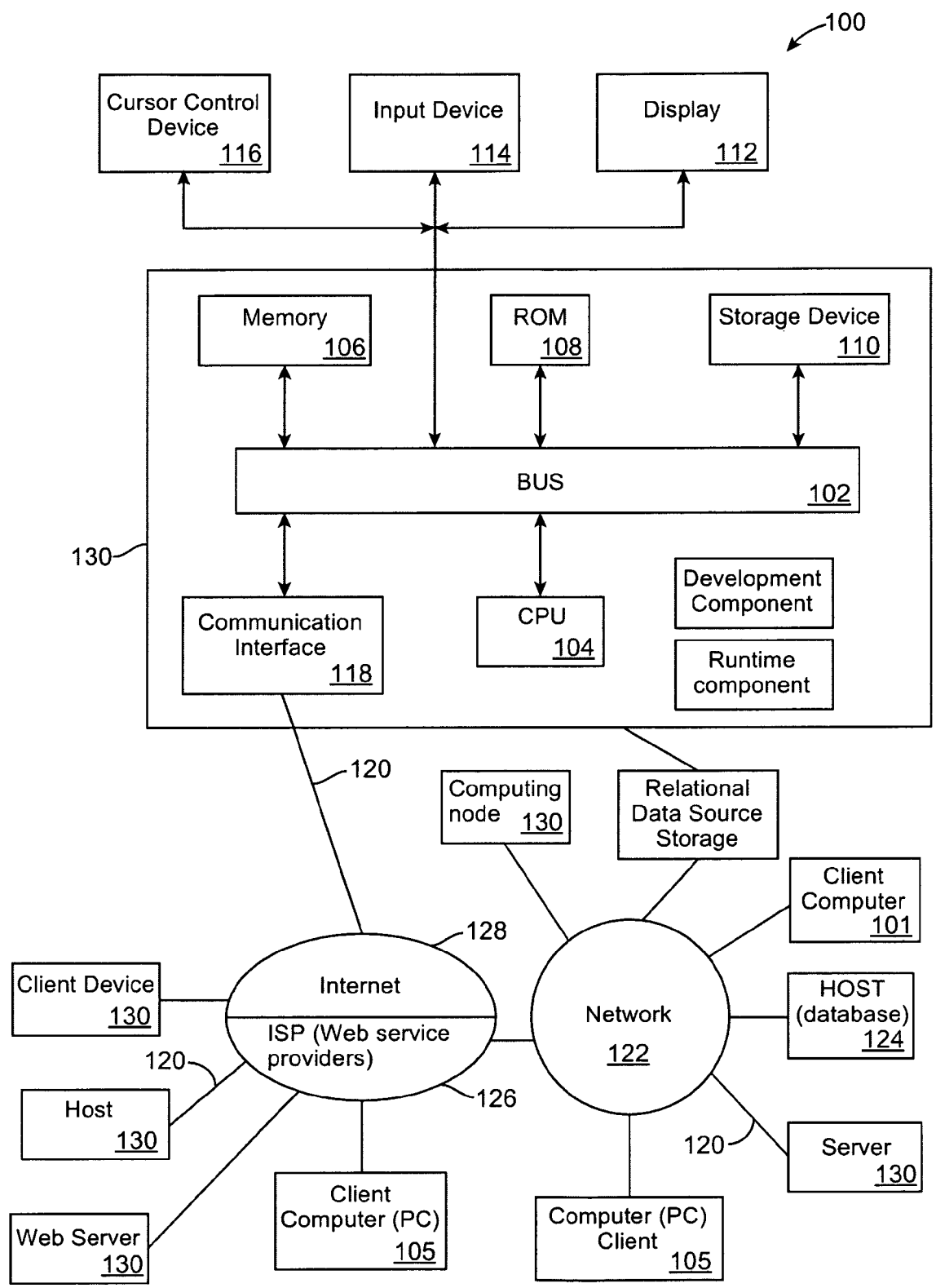
FIG. 5 shows a functional block diagram of a system for implementing processing an object-oriented query to retrieve data from a data source stored on a data storage device connected to a computer.

FIG. 5 shows a block diagram of example architecture of an embodiment of a system 100 for implementing an embodiment of the invention. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104. The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and, as interconnected machine modules, within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of processing an object-oriented query to retrieve data from a data source stored on a data storage device connected to a computer, comprising:
    receiving a Java Query Language (JQL) query including one or more JAVA features and arranged to match the syntax of a Structured Query Language (SQL) query, wherein the one or more JAVA features comprise any of: generic classes, imported static members, variable length argument lists, and predefined constant data types;
    using a JAVA compliant compiler for detecting any syntax error in the JQL query at compile time, prior to actual compiling and prior to processing the JQL query for execution, wherein using the JAVA compliant compiler further comprises performing compile-time checking without external tools, plug-ins or a modified JAVA compiler; and
    if a syntax error is detected, then providing a notification of the syntax error;
    otherwise if a syntax error is not detected, then processing the JQL query for retrieving data from the data source,
    wherein processing the JQL query for retrieval further comprises generating code from the JQL query, suitable for the data source.

2. The method of claim 1, wherein using the JAVA compliant compiler for detecting any syntax error in the JQL query further comprises performing compile-time checking when parsing generics-based code in the JQL query with the JAVA compliant compiler, wherein the JAVA compliant compiler comprises an unmodified JAVA compliant compiler.

3. The method of claim 2, further comprising:
    arranging and formatting structured language query (SQL) code as JAVA code for using the JAVA compliant compiler for detecting any syntax error in the JQL query, wherein the JQL query comprises a Java Query Language query comprising a type safe, Java based, object-oriented and declarative query.

4. The method of claim 3, wherein said data source comprises one of: a relational data source, memory collections, XML files.

5. The method of claim 1, wherein using the JAVA compliant compiler for detecting any syntax error in the JQL query prior to processing the JQL query for execution, is performed at query development time.

6. A computer program product for processing an object-oriented query to retrieve data from a data source stored on a data storage device connected to a computer, the computer program product comprising:
    a computer usable storage memory having computer readable program code embodied therewith, wherein the computer readable program code when executed on the computer causes the computer to:
    receive a Java Query Language (JQL) query including one or more JAVA features and arranged to match the syntax of a Structured Query Language (SQL) query, wherein the one or more JAVA features comprise any of: generic classes, imported static members, variable length argument lists, and predefined constant data types;
    using a JAVA compliant compiler to detect any query error due to a syntax error in the JQL query at compile time, prior to actual compiling and prior to processing the JQL query for execution, wherein using the JAVA compliant compiler further comprises performing compile-time checking without external tools, plug-ins or a modified JAVA compiler;
    if a syntax error is detected, then provide a notification of the syntax error;
    otherwise if a syntax error is not detected, then process the JQL query for retrieving data from the data source,
    wherein processing the JQL query for retrieval further comprises generating code from the JQL query, suitable for the data source.

7. The computer program product of claim 6, wherein using the JAVA compliant compiler for detecting any syntax error in the JQL query further comprises performing compile-time checking when parsing generics-based code in the JQL query.

8. The computer program product of claim 7, further comprising arranging and formatting structured query language (SQL) code as JAVA code for using the JAVA compliant compiler for detecting any syntax error in the JQL query,
    wherein the JQL query comprises a Java Query Language query that comprises a type safe, Java based, object-oriented and declarative query.

9. The computer program product of claim 8 wherein said data source comprises one of: a relational data source, memory collections, XML files.

10. The computer program product of claim 6 further comprising computer readable program code for using the JAVA compliant compiler for detecting any syntax error in the JQL query prior to processing the JQL query for execution at query development time.

11. A system for processing an object-oriented query, comprising:
    a data source stored on a data storage device connected to a computer of the system; and
    a query module configured for receiving a JQL query including one or more JAVA features and arranged to match the syntax of a Structured Query Language (SQL) query, and to retrieve data from the data source, using a JAVA compliant compiler for detecting any syntax error in the JQL query at compile time, prior to actual compiling and prior to processing the JQL query for execution, wherein using the JAVA compliant compiler further comprises performing compile-time checking without external tools, plug-ins or a modified JAVA compiler, wherein if a syntax error is detected, then providing notification of the syntax error, otherwise if a syntax error is not detected, then the JQL query is processed for retrieving data from the data source, wherein the one or more JAVA features comprise any of: generic classes, imported static members, variable length argument lists, and predefined constant data types, wherein processing the JQL query for retrieval further comprises generating code from the JQL query, suitable for the data source.

12. The system of claim 11, wherein the query module is further configured for using the JAVA compliant compiler for detecting any syntax error in performing compile-time checking when parsing generics-based code in the JQL query without using external tools, plug-ins or a modified JAVA compiler.

13. The system of claim 12, further comprising:
arranging and formatting structured query language (SQL) code as JAVA code for using the JAVA compliant compiler for detecting any syntax error in the JQL query, wherein the JQL query comprises a Java Query Language query that comprises a type safe, Java based, object-oriented and declarative query.

14. The system of claim 13, wherein said data source comprises one of: a relational data source, memory collections, XML files.

15. The system of claim 11, wherein the query module is further configured for using the JAVA compliant compiler for detecting any syntax error in the JQL query at query development time prior to actual execution.

* * * * *